(12) United States Patent
Waas et al.

(10) Patent No.: US 7,146,363 B2
(45) Date of Patent: Dec. 5, 2006

(54) SYSTEM AND METHOD FOR CARDINALITY ESTIMATION BASED ON QUERY EXECUTION FEEDBACK

(75) Inventors: Florian M. Waas, Seattle, WA (US); Cesar A. Galindo-Legaria, Redmond, WA (US); Milind M. Joshi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 10/441,812

(22) Filed: May 20, 2003

(65) Prior Publication Data

US 2004/0236722 A1 Nov. 25, 2004

(51) Int. Cl.
*G06F 17/30* (2006.01)

(52) U.S. Cl. .............................. 707/6; 707/2
(58) Field of Classification Search ............... 707/1–6
See application file for complete search history.

(56) References Cited

U.S. PATENT DOCUMENTS

| | | | | |
|---|---|---|---|---|
| 5,588,150 A | * | 12/1996 | Lin et al. ................... | 707/1 |
| 5,761,653 A | * | 6/1998 | Schiefer et al. .............. | 707/2 |
| 5,822,747 A | * | 10/1998 | Graefe et al. ................ | 707/2 |
| 6,021,405 A | * | 2/2000 | Celis et al. .................. | 707/2 |
| 6,029,163 A | * | 2/2000 | Ziauddin .................... | 707/2 |
| 6,272,487 B1 | * | 8/2001 | Beavin et al. ................ | 707/2 |
| 6,366,901 B1 | * | 4/2002 | Ellis ........................ | 707/2 |
| 6,847,978 B1 | * | 1/2005 | Ellis et al. .................. | 707/102 |
| 6,947,927 B1 | * | 9/2005 | Chaudhuri et al. ........... | 707/3 |

OTHER PUBLICATIONS

Chaudhuri, S., "An Overview of Query Optimization in Relational Systems", *PODS*, 1998, 34-43.
Dalvi, N.N. et al., "Piplelining in Multi-Query Optimization", *PODS*, 2001, 12 pages.
Finkelstein, S., "Common Expression Analysis in Database Applications", *ACM*, 1982, Computer Science Department, Stanford University, 235-245.
Goel, P., et al., "SQL Query Optimization: Reordering for a General Class of Queries", *SIGMOD*, 1996, 47-56.
Roy, P. et al., "Efficient andExtensible Algorithms for Multi Query Optimization", *MOD*, 2000, 249-260.
Slivinskas, G. et al., "Adaptable Query Optimization and Evaluation in Temporal Middleware", *ACM SIGMOD*, 2001, 127-138.
Yu, C.T. et al., "On the Design of a Query Processing Strategy in a Distributed Database Environment", *ACM*, 1983, 30-39.
Aboulnaga, A. et al., "Self-Tuning Histograms: Building Histograms without Looking at Data", 12 pages, Jun. 1999.
König, A.C. et al., "Combining Histograms and Parametric Curve Fitting for Feedback-Driven Query Result-Size Estimation", *Proceedings of the 25th VLDB Conference*, 1999, 13 pages.
Stillger, M. et al., "LEO-DB2's Learning Optimizer", *Proceedings of the 27th VLDB Conference*, 2001, 10 pages.

* cited by examiner

*Primary Examiner*—Greta Robinson
*Assistant Examiner*—Cheryl Lewis
(74) *Attorney, Agent, or Firm*—Woodcock Washburn LLP (57) ABSTRACT

During query execution, statistics associated with expressions are observed. Such observed statistics preferably include the cardinality of each expression. The observed statistics are submitted to an expression manager as feedback from the executed query. The statistics are preferably stored for use in estimating the cardinality of execution plans for future queries.

20 Claims, 5 Drawing Sheets

SYSTEM AND METHOD FOR CARDINALITY ESTIMATION BASED ON QUERY EXECUTION FEEDBACK

BACKGROUND OF THE INVENTION

1. Field of the Invention

The present invention relates to the field of query optimization and, more specifically, to estimating cardinality based on query execution feedback.

2. Description of the Prior Art

A query optimizer is used to determine the best plan for executing the query. To select such an execution plan, the optimizer enumerates a collection of candidate plans, and picks the one with the least anticipated execution cost. An execution plan is composed of a number of steps of data processing, whose cost is derived based on the particular execution algorithm considered, and the estimated number of rows to process. The quality of plans generated by the optimizer is tied to the accuracy of its cost estimation. Incorrect estimation may lead the optimizer to regard some plans as efficient, when in reality they are very expensive to execute. As effective optimization and good physical design can introduce dramatic performance improvements, so selecting the wrong execution plan can lead to dramatic slowdowns.

In conventional query optimization methods, the number of rows to be used in a query is generally estimated using statistics information about the data stored in the database. Such statistics are typically gathered by executing special purpose queries or processes, which read all or part of a database table, perform some analysis, and store the results for later use by the query optimizer. Statistics gathering may be triggered automatically based on the columns used to execute a query.

Gathering statistics for the purpose of query optimization has a number a drawbacks. For example, separate special purpose processes to collect statistics overlap considerably with regular query execution and the resulting overhead may be significant. For systems that trigger such processes automatically, the processes may introduce unexpected increases to the system load.

Furthermore, statistics that are gathered may be over-inclusive or under-inclusive with respect to queries. Statistics-gathering processes are generic and they collect information that is not particularly tied to the current system workload. Thus, statistics may be unnecessarily gathered for tables or portions of tables that are not requested by the queries. For example, statistics may be unnecessarily gathered for a portion of a table covering the year 2001 when queries request data from only from the year 2002. Additionally, if statistics exist for two columns, then statistics on the combination of the columns may be needed if the information is correlated. However, it is impossible to determine whether the information is correlated simply by looking at the query syntax and examining all pairs of columns in the schema is cost prohibitive.

Another drawback of statistics gathering is that, as the database changes, statistics become invalid and must be updated. In manual update systems, statistics are typically updated by database administrators, who generally do not have tools to measure the degree of staleness of statistics and the impact of such staleness on plan selection. In automatic systems, statistics are updated based on a number of changes made to base tables. Such automatic systems employ simple counters and heuristics to decide when it is necessary to re-compute statistics, thereby requiring extra processing. In both manual and automatic systems, statistics are sometimes computed when there is no need and are also sometimes not computed when there is a need.

Yet another drawback of statistics gathering is that, when such statistics are used in cardinality estimation, errors grow as estimation is done on top of estimation, so that after several filters and joins, the estimated cardinality may be way off the actual. In addition, there are constructs that simply cannot be estimated based on statistics of base table columns. The standard approach when such constructs are encountered is to use a "guess" or "magic number," such as the well known ⅓ data reduction factor for inequality comparisons and ¹/₁₀ data reduction factor for equality.

The problem with inaccurate estimation is not only performance, but the introduction of erratic behavior. Queries are "unstable" when there are estimation errors in their optimization. The reason is switch-over points. For example, it is known that index lookup is efficient when there are few rows to lookup, and table scan is preferable if access to all the rows is expected; for cases in between, a choice must be made and there is a switch-over point between the two alternatives. Similar switch-over points occur in join order, and in selection of various execution algorithms. When a query is close to a switch-over point, minor changes can make it choose one or the other option, which is acceptable as long as the estimation is correct. However, if a query is incorrectly estimated close to a switch-over point, the plan generated will appear to be randomly chosen, with vastly different performance.

Adding or removing a simple, non-selective condition in a query may result in dramatic execution slowdown; or a query that used to run well may suddenly become very slow, after some rows are added to one of the base tables. Two queries that are very close in form and semantics may perform very differently, if one of them happens to use a construct that is not supported by the cardinality estimation model. Software upgrades, and even re-computation of statistics can introduce unpredictable changes in query plans and performance degradation. Such behavior confuses and frustrates developers and database administrators. Conventional systems fail to deliver on the goal of high level, declarative database languages.

Thus, there is a need in the art for systems and methods for cardinality estimation in which statistics are created and updated automatically based on continuous observation of query execution. It is desired that such systems and methods reduce the overhead involved with statistics gathering, improve the relevance of statistics to a workload, reduce sensitivity of statistics to data changes, and improve the accuracy of cardinality estimation.

SUMMARY OF THE INVENTION

Accordingly, systems and methods for cardinality estimation based on query execution feedback are disclosed. When a query is submitted for execution, an optimizer develops candidate plans for executing the query. Such candidate plans each include a plurality of candidate expressions. Such candidate expressions are sent to an expression manager, which matches the candidate expressions with stored expressions from previously executed queries. If a stored expression is matched, then the expression manager retrieves statistics associated with the stored expression. Such statistics preferably include the cardinality of the stored expression.

The optimizer estimates the cardinality of each candidate plan based, at least in part, on the retrieved statistics. When the cardinality of each candidate plan has been estimated, the optimizer selects the plan with the lowest estimated cardinality. The query is preferably executed according to the selected plan.

During execution, statistics associated with each expression in the selected execution plan are observed. The observed statistics preferably include the cardinality of each expression. The observed statistics are submitted as feedback to the expression manager and are preferably stored for use in estimating the cardinality of execution plans for future queries.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

Figure 1:
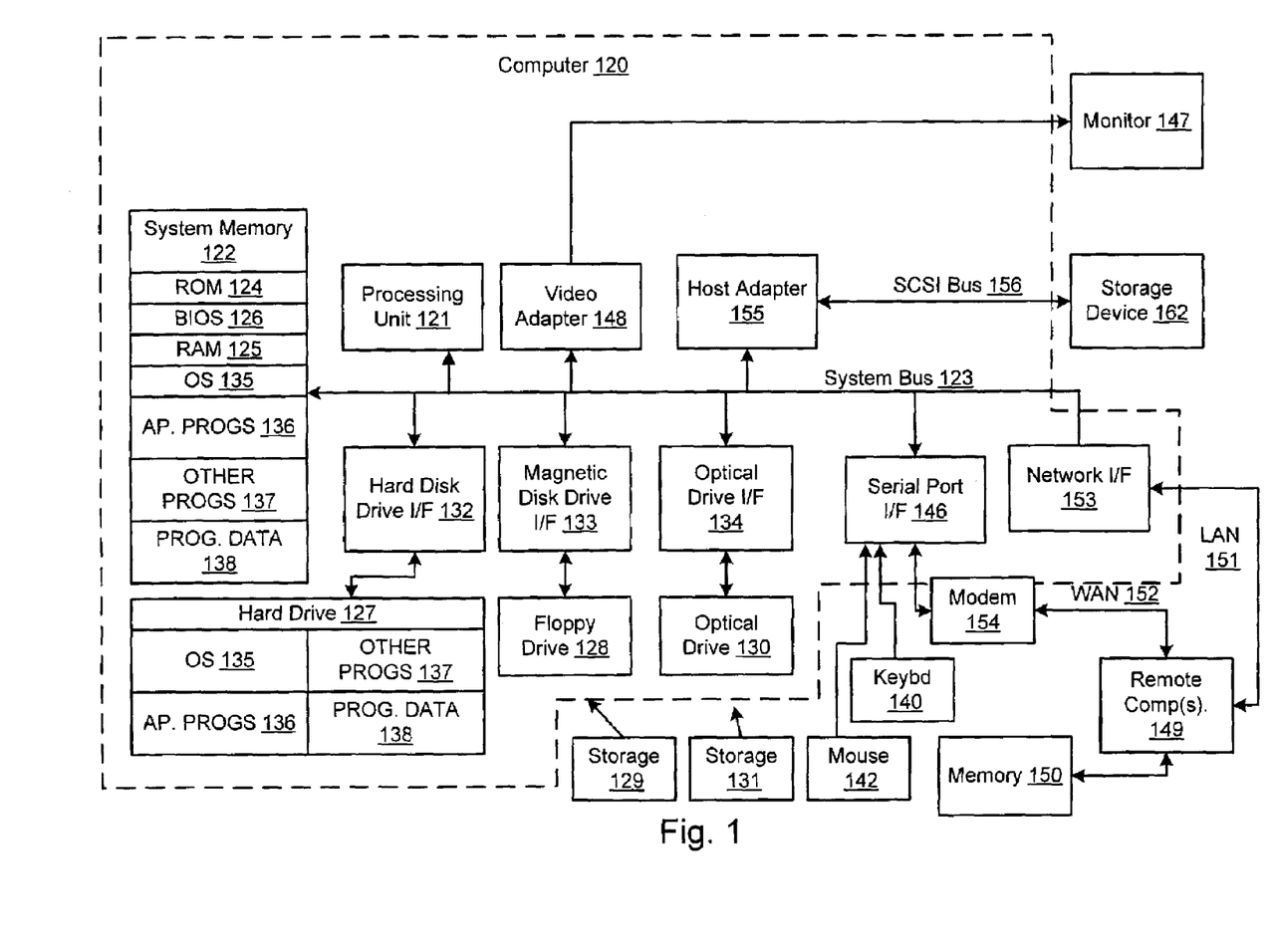
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard-disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems and Methods of the Present Invention

Figure 2:
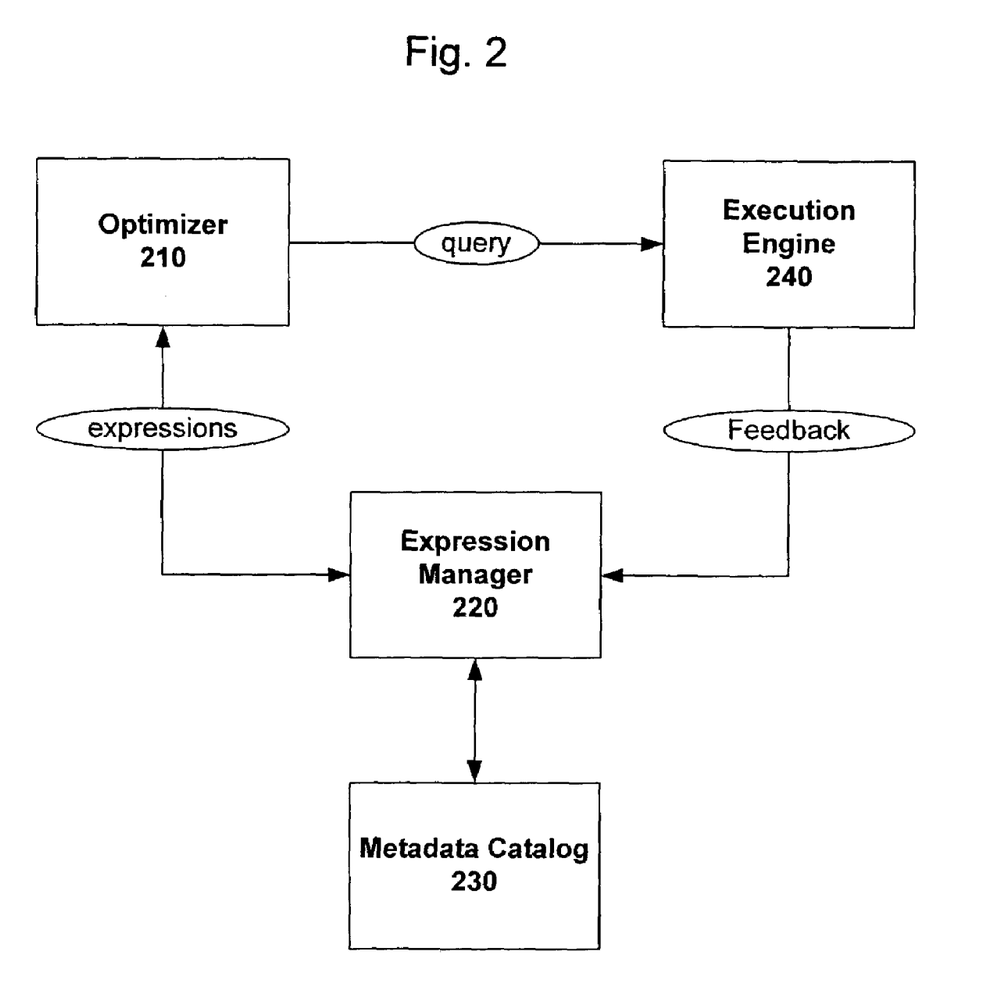
FIG. 2 is a block diagram of an exemplary system for estimating cardinalities based on query execution feedback in accordance with the present invention.

A block diagram of an exemplary system for estimating cardinalities based on query execution feedback in accordance with the present invention is shown in FIG. 2. Generally, when a query is submitted, optimizer 210 develops candidate plans for execution of the query. Expression manager 220 provides statistics on such candidate execution plans based on feedback from previously executed queries. Optimizer 210 then estimates the cardinality of each candidate plan based on the statistics and selects the plan with the lowest estimated cardinality. Execution engine 240 executes the query according to the selected plan. A storage device comprises metadata catalog 230 that stores statistics observed during query execution for use in estimating the cardinality of execution plans for future queries.

Optimizer 210 develops candidate execution plans. Such candidate plans preferably each include a plurality of expressions. An expression is an operation such as, for example, a join operation, which is performed on specified operands.

If a candidate expression is matched to a stored expression from a previously executed query, then optimizer 210 receives statistics associated with the matched expression. Such statistics preferably include the observed cardinality of the expression.

If a candidate expression is not matched to a stored expression, optimizer 210 may employ conventional methods such as, for example, executing special purpose processes to gather statistics associated with the expression. The statistics retrieved from such special purpose queries are not generated using feedback and, therefore, do not include observed cardinalities. Rather, the statistics retrieved from such special purpose queries preferably include a distribution of column values such as, for example, a histogram.

Optimizer 210 estimates the cardinality of each candidate plan based on statistics and selects the candidate plan with the lowest estimated cardinality.

Expression manager 220 matches candidate expressions to stored expressions. The matching of candidate expressions is discussed in detail below with reference to FIG. 3.

Once an expression is matched, expression manager 220 retrieves statistics associated with the matched expression from metadata catalog 230.

In addition to matching candidate expressions, expression manager 220 preferably assigns unique identifiers to each expression in a selected execution plan during expression registration. The identifier enables statistics associated with the expression to be efficiently stored and retrieved. If an expression matches an expression that is already stored, then the expression maintains the unique identifier of the stored expression.

Metadata catalog 230 preferably stores statistics associated with stored expressions. Such statistics are preferably indexed according to the identifier of the expression with which they are associated.

Metadata catalog 230 may optionally be "trimmed". Trimming may be performed automatically at regular intervals or manually as deemed necessary. Trimming is desirably performed to keep the data stored at metadata catalog 230 to a manageable size, thereby ensuring that the matching process is not unnecessarily delayed by searching expressions that are not likely to be matched. During such trimming, statistics that are not likely to be matched are deleted from metadata catalog 230. Such statistics may be identified by a number of factors such as, for example, a duration since their last match or a change to the portion of a database to which they correspond.

In an alternative embodiment, statistics may be stored as transient data that is lost after the query processing system is shut down. In such an alternative embodiment, previous query workloads do not affect the current workload. Such an alternative embodiment is, therefore, advantageous when there is minimal overlap between workloads.

Figure 3:
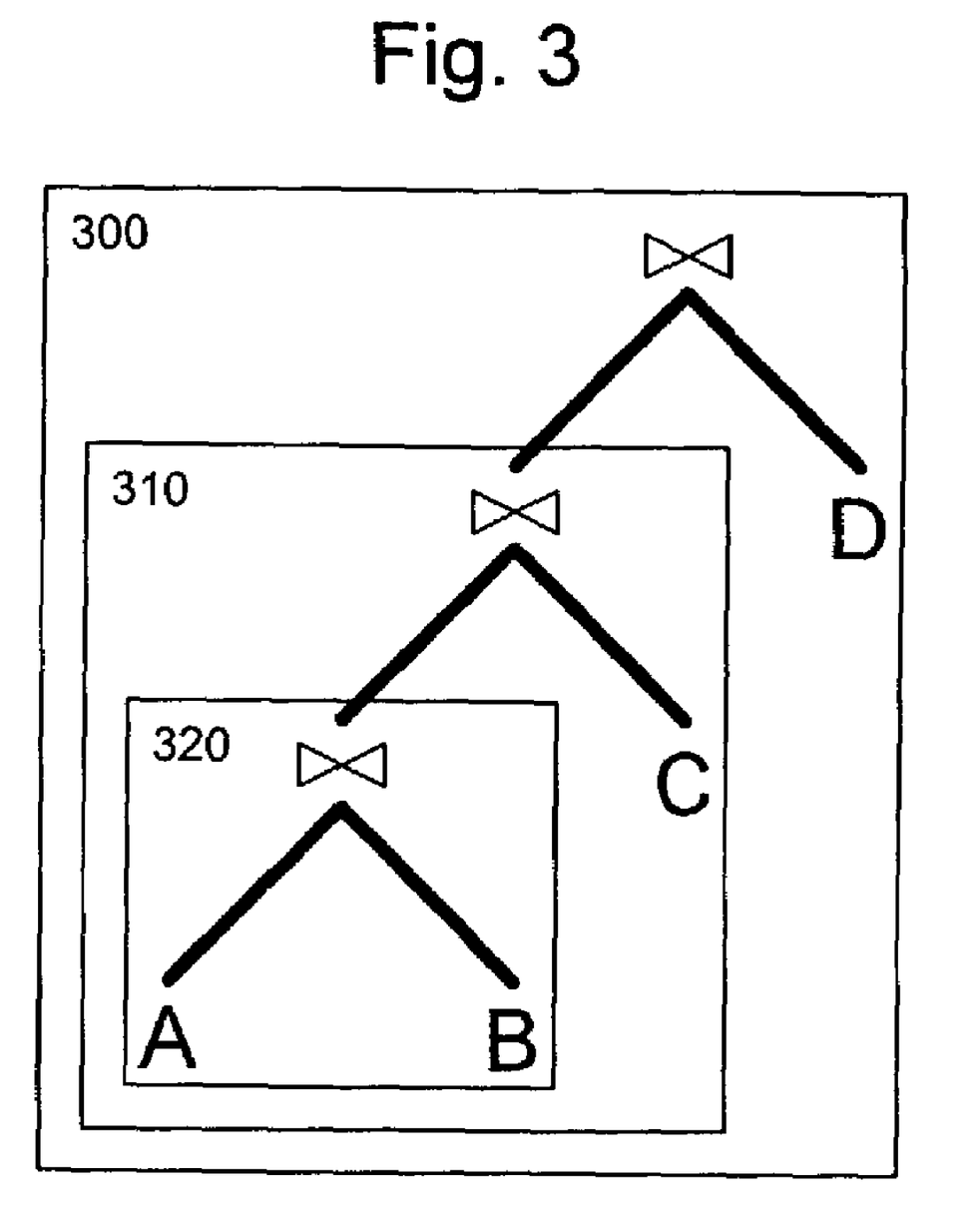
FIG. 3 is a block diagram of an exemplary plurality of expressions in accordance with the present invention.

A block diagram of an exemplary execution plan in accordance with the present invention is shown in FIG. 3. The exemplary execution plan includes a plurality of expressions including first level match 300, second level match 310, and third level match 320.

During expression registration, expression manager 220 assigns a unique identifier to every intermediate result that will be computed during execution by execution engine 240. During execution, the cardinality of each registered expression 300, 310, and 320 is preferably observed. The observed cardinalities are submitted to expression manager 220 as feedback and are stored in metadata catalog 230 for further processing. Thus, the exemplary execution plan shown in FIG. 3 produces feedback for three unique expressions 300, 310, and 320 rather than simply producing feedback for highest level expression 300.

During expression matching, expression manager 220 matches candidate expressions in candidate execution plans with stored expressions. If a candidate execution plan includes a single expression that matches to a lower level stored expression, then a match to the lower level stored expression will preferably be returned even if there is no match to higher level stored expressions. For example, if a candidate execution plan includes a candidate expression identical to lowest level stored expression 320, then a match to lowest level stored expression 320 will preferably be returned even if there is no match to higher level stored expressions 300 and 310.

Furthermore, if a candidate execution plan includes multiple expressions that match stored expressions, then desirably all matching levels, rather than only the highest matching level, are returned. For example, if a candidate execution plan includes expressions that match to each of stored expressions 300, 310, and 320, then matches to stored expressions 300, 310, and 320 will each be returned. The statistics for each matching level provide data only about how to optimize query processing at the corresponding level. For example, the statistics for expression 310 provide data only about how to join "C" and ("A" join "B"). The statistics for expression 320 provide data about how to join "A" and "B".

Figure 4:
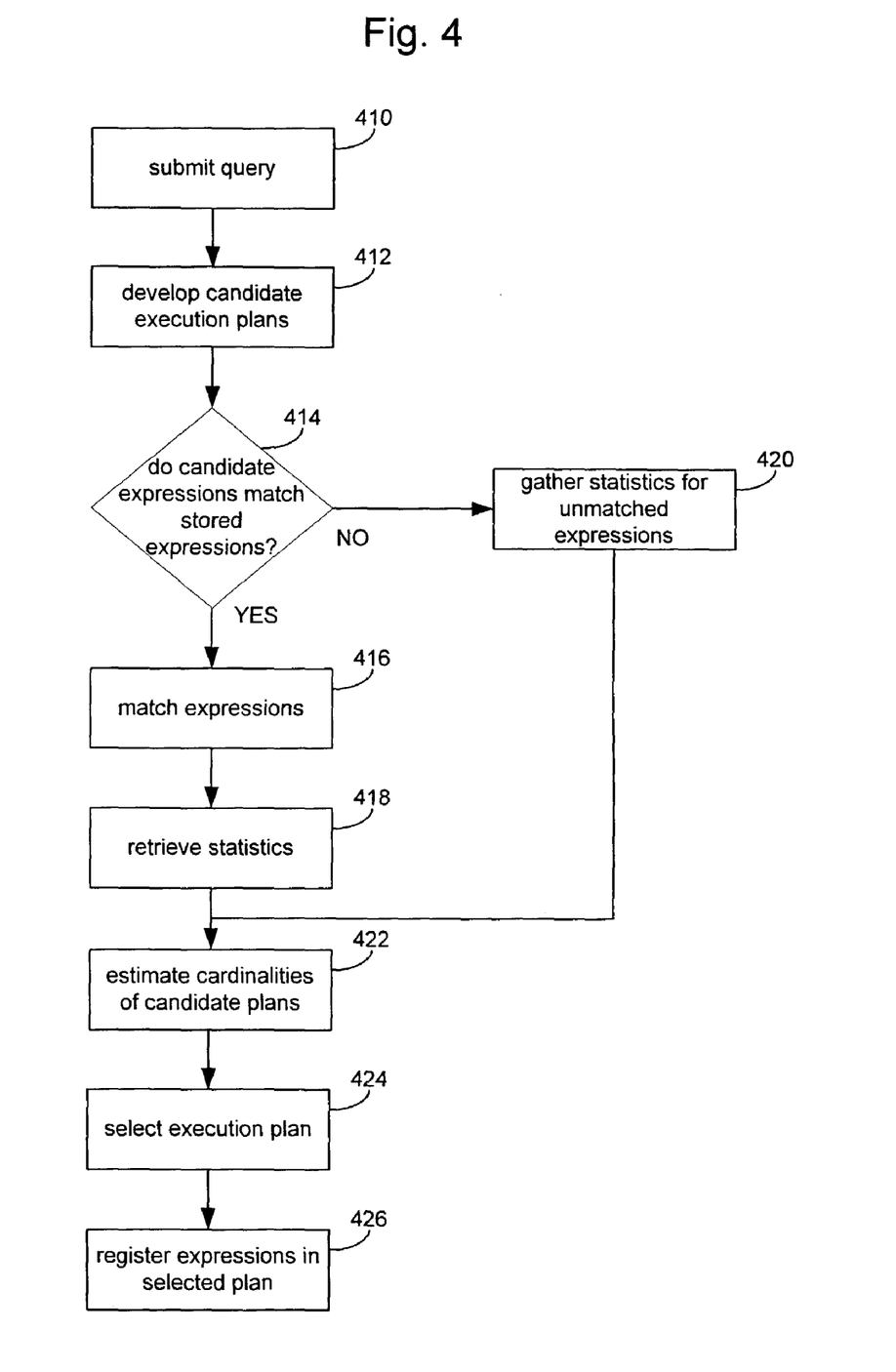
FIG. 4 is a flowchart of an exemplary method for generating a query execution plan in accordance with the present invention.

A flowchart of an exemplary method for generating a query execution plan in accordance with the present invention is shown in FIG. 4. Generally, when a query is submitted, candidate execution plans are developed. Each such candidate plan includes multiple candidate expressions. Such candidate expressions are matched to stored expressions and statistics associated with each stored expression are retrieved. Such retrieved statistics preferably include the observed cardinality of the expression with which they are associated. The cardinality of each candidate plan is estimated based, at least in part, on the retrieved statistics. An execution plan is selected based, at least in part, on the estimated cardinality of each candidate plan.

At step 410, a query is submitted, and, at step 412, optimizer 210 develops candidate plans for execution of the query. Such candidate plans preferably each include a plurality of candidate expressions. An expression is an operation such as, for example, a join operation, which is performed on specified operands.

At step 414, expression manager 220 determines if candidate expressions match stored expressions from previously executed queries. If so, at step 416, expression manager 220 matches candidate expressions to stored expressions. If a candidate execution plan includes a single expression that matches to a lower level stored expression, then a match to the lower level stored expression will preferably be returned even if there is no match to higher level stored expressions. Furthermore, if a candidate execution plan includes multiple expressions that match stored expressions, then desirably all matching levels are returned. The highest level match includes the most accurate statistics for the plurality of expressions.

At step 418, expression manager 220 retrieves statistics associated with each matched expression. Such retrieved statistics preferably include the observed cardinality of the expression. Such statistics are preferably stored in metadata catalog 230 and are preferably indexed according to a unique identifier of the expression with which they are associated.

If, at step 414, a candidate expression is not matched to a stored expression, then, at step 420, statistics for such an unmatched expression are gathered. Such gathered statistics are not generated using feedback and, therefore, do not include observed cardinalities such as the statistics retrieved at step 418. Statistics may be gathered automatically for each unmatched expression. However, to avoid disruption of query processing, such automatically gathered statistics are preferably statistics that are generated without excessive processing such as, for example, simple statistics on base tables. Alternatively or in addition to automatic gathering, statistics may be gathered manually at any time.

At step 422, optimizer 210 estimates the cardinality of each candidate plan based on statistics and, at step 424, optimizer 210 selects an execution plan. The candidate execution plan with the lowest cost is preferably selected as the execution plan. The cost of each candidate plan is preferably determined based, at least in part, on the estimated cardinality of each candidate plan.

At step 426, expressions are registered. During registration, expression manager 220 assigns a unique identifier to each expression in the selected execution plan. Registration enables observed statistics associated with the expression to be efficiently stored at query execution for further processing. As should be appreciated, if an expression matches an expression that is already stored, then the expression maintains the unique identifier of the stored expression.

Expressions corresponding to every level of expressions present in the selected query are preferably registered. For example, a lower level expression will preferably be registered even if higher level expressions are present in the execution plan. Registration of every level of expressions enables future candidate execution plans corresponding to only a lower level of the selected execution plan to be matched.

Thus an exemplary method for generating an execution plan has been disclosed in FIG. 4. Once the execution plan for the query is generated, the query is preferably executed according to the execution plan. The executed query is preferably used to provide feedback for generating execution plans for future queries.

Figure 5:
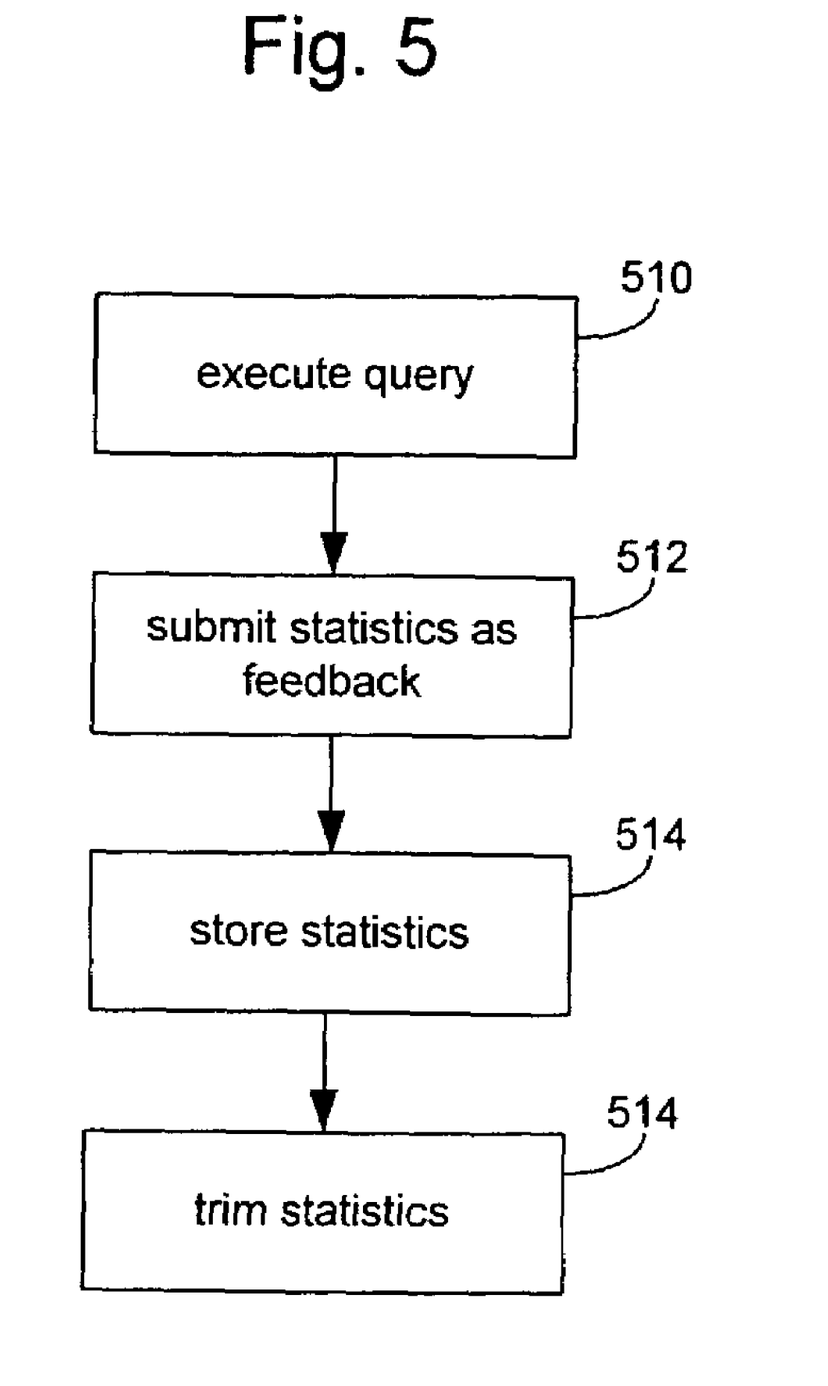
FIG. 5 is a flowchart of an exemplary method for providing query execution feedback in accordance with the present invention.

A flowchart of an exemplary method for providing query execution feedback in accordance with the present invention is shown in FIG. 5. Generally, during query execution, statistics associated with registered expressions are observed. Such observed statistics preferably include the cardinality of each registered expression. The observed statistics are submitted to expression manager 220 as feedback from the executed query. The statistics are preferably stored in metadata catalog 230 for use in estimating the cardinality of execution plans for future queries.

At step 510, execution engine 240 executes the query according to the selected execution plan. During execution of the query, statistics associated with each registered expression are generated as feedback. Such statistics preferably include the observed cardinality of each registered expression. Such observed information is both highly accurate and reliable and is at least if not more expressive than statistics gathered through conventional methods. Furthermore, because such statistics are preferably generated as part of query execution, they are generated without requiring additional processing. At step 512, the observed statistics are submitted to expression manager 220 as feedback from the executed query.

At step 514, the statistics are stored 230 for use in estimating the cardinality of execution plans for future queries. The statistics are preferably stored in metadata catalog 230 and are preferably indexed according to the unique identifier of the expression with which they are associated. The unique identifiers are assigned during expression registration at step 426.

At step 516, metadata catalog 230 is trimmed. Trimming of stored statistics is an optional step which may be performed at any time. Trimming may be performed automatically at regular intervals or manually as deemed necessary. Trimming is desirably performed to keep the data stored at metadata catalog 230 to a manageable size, thereby ensuring that the matching process performed at steps 414 and 416 is not unnecessarily delayed by searching expressions that are not likely to be matched.

During such trimming, statistics that are not likely to be matched are deleted from metadata catalog 230. Such statistics may be identified by a number of factors such as, for example, a duration since their last match or a change to the portion of a database to which they correspond.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

We claim:

1. A computer implemented method for estimating a cardinality of an expression, the method comprising:
   matching the expression with a stored expression;
   retrieving previously gathered statistics associated with the stored expression, the previously gathered statistics comprising statistics based, at least in part, on a previous execution of a previous query; and
   estimating the cardinality of the expression based on the previously gathered statistics.

2. The method of claim 1, wherein retrieving the previously gathered statistics associated with the stored expression comprises:
   determining an identifier of the stored expression;
   retrieving the previously gathered statistics associated with the stored expression, the previously gathered statistics indexed according to the identifier.

3. The method of claim 1, wherein estimating the cardinality of the expression based on the previously gathered statistics comprises estimating the cardinality of the expression based on the observed cardinality of the stored expression.

4. The method of claim 1, further comprising developing an execution plan for a query, the execution plan including the expression.

5. The method of claim 4, further comprising:
   selecting the execution plan based on the estimated cardinality of the expression;
   assigning an identifier to the expression;
   executing the query according to the execution plan;
   observing a cardinality of the expression; and
   storing the observed cardinality wherein the stored cardinality is indexed according to the identifier of the expression.

6. The method of claim 5, wherein assigning an identifier to the expression comprises:
   if the expression matches a stored expression, then assigning the expression the identifier of the stored expression,
   if the expression does not match the stored expression, then assigning the expression a new identifier.

7. The method of claim 5, further comprising trimming the stored cardinality.

8. A computer readable medium having stored thereon computer readable instructions executed in a computer for performing the following steps:
   matching an expression with a stored expression;
   retrieving previously gathered statistics associated with the stored expression, the previously gathered statistics comprising statistics based,-at least in part, on a previous execution of a previous query; and
   estimating a cardinality of the expression based on the previously gathered statistics.

9. The computer readable medium of claim 8, wherein retrieving statistics associated with the stored expression comprises:
   determining an identifier of the stored expression;
   retrieving the previously gathered statistics associated with the stored expression, the previously gathered statistics indexed according to the identifier.

10. The computer readable medium of claim 8, wherein estimating the cardinality of the expression based on the previously gathered statistics comprises estimating the cardinality of the expression based on the observed cardinality of the stored expression.

11. The computer readable medium of claim 8, further comprising computer readable instructions for performing the step of developing an execution plan for a query, the execution plan including the expression.

12. The computer readable medium of claim 11, further comprising computer readable instructions for performing the steps of:
   selecting the execution plan based on the estimated cardinality of the expression;
   assigning an identifier to the expression;
   executing the query according to the execution plan;
   observing a cardinality of the expression; and
   storing the observed cardinality wherein the stored cardinality is indexed according to the identifier of the expression.

13. The computer readable medium of claim 12, wherein assigning an identifier to the expression comprises:
   if the expression matches a stored expression, then assigning the expression the identifier of the stored expression,
   if the expression does not match a stored expression, then assigning the expression a new identifier.

14. The computer readable medium of claim 12, further comprising computer readable instructions for performing the step of trimming the stored cardinality.

15. A computer implemented system for estimating a cardinality of an expression, the system comprising:
   an expression manager for performing the steps of:
      matching the expression with a stored expression; and
      retrieving previously gathered statistics associated with the stored expression, the previously gathered statistics comprising statistics based, at least in part, on a previous execution of a previous query; and
   an optimizer for performing the step of estimating the cardinality of the expression based on the previously gather statistics.

16. The system of claim 15, further comprising a metadata catalog for storing the previously gathered statistics.

17. The system of claim 16, wherein the previously gathered statistics are indexed in the metadata catalog according to an identifier of the stored expression.

18. The system of claim 17, further comprising an execution engine for executing the query according to the execution plan.

19. The system of claim 15, wherein the previously gathered statistics comprise an observed cardinality of the stored expression.

20. The system of claim 15, wherein the expression is an execution plan for a query, the execution plan developed by the optimizer.

* * * * *